(12) United States Patent
Meike et al.

(10) Patent No.: US 9,313,344 B2
(45) Date of Patent: Apr. 12, 2016

(54) METHODS AND APPARATUS FOR USE IN MAPPING IDENTIFIED VISUAL FEATURES OF VISUAL IMAGES TO LOCATION AREAS

(75) Inventors: Roger Charles Meike, Redwood City, CA (US); Fabio Dario Katz, Kanata (CA); Adel Amin Abdel Azim Youssef, Santa Clara, CA (US)

(73) Assignee: BlackBerry Limited, Waterloo, Ontario (CA)

(*) Notice: Subject to any disclaimer, the term of this patent is extended or adjusted under 35 U.S.C. 154(b) by 441 days.

(21) Appl. No.: 13/486,836

(22) Filed: Jun. 1, 2012

(65) Prior Publication Data
US 2013/0321646 A1 Dec. 5, 2013

(51) Int. Cl.
*G06K 9/46* (2006.01)
*H04N 1/00* (2006.01)
*H04N 21/414* (2011.01)
*H04N 21/44* (2011.01)
*H04N 21/45* (2011.01)
*H04N 21/4788* (2011.01)
*H04N 21/658* (2011.01)
*H04N 21/81* (2011.01)

(52) U.S. Cl.
CPC ....... *H04N 1/00244* (2013.01); *H04N 1/00336* (2013.01); *H04N 21/41407* (2013.01); *H04N 21/44008* (2013.01); *H04N 21/4524* (2013.01); *H04N 21/4788* (2013.01); *H04N 21/6582* (2013.01); *H04N 21/8153* (2013.01); *H04N 2201/0084* (2013.01); *H04N 2201/3214* (2013.01); *H04N 2201/3215* (2013.01); *H04N 2201/3253* (2013.01); *H04N 2201/3274* (2013.01)

(58) Field of Classification Search
None
See application file for complete search history.

(56) References Cited

U.S. PATENT DOCUMENTS

| 6,931,147 | B2 | 8/2005 | Colmenarez et al. |
|---|---|---|---|
| 7,460,737 | B2 | 12/2008 | Shuster |
| 2003/0108241 | A1 | 6/2003 | Colmenarez et al. |
| 2006/0128263 | A1 | 6/2006 | Baird |
| 2007/0070233 | A1 | 3/2007 | Patterson |
| 2007/0226044 | A1 | 9/2007 | Hanson |

(Continued)

FOREIGN PATENT DOCUMENTS

| WO | 2008024949 A2 | 2/2008 |
|---|---|---|
| WO | 2009088716 A2 | 7/2009 |

OTHER PUBLICATIONS

European Search Report & Written Opinion for EP patent application # 12170262.5, Dec. 7, 2012.
Wilh Elmer et al. "Stimmungsgasometer", http://www..xn--fhlometer-q9a.de/, Dec. 7, 2011.

(Continued)

*Primary Examiner* — Stephen R Koziol
*Assistant Examiner* — Amandeep Saini
(74) *Attorney, Agent, or Firm* — Conley Rose, P.C.; J. Robert Brown, Jr.

(57) ABSTRACT

In one example, a computer device includes one or more processors and a camera module coupled to the one or more processors. The camera module is configured to capture visual images. The one or more processors are configured to analyze image data of a visual image for identifying whether the visual image includes a visual feature, and produce a message which includes a visual feature indication and a location indication. The visual feature indication indicates whether the visual image includes the visual feature, and the location indication indicates a location at which the visual image was captured.

18 Claims, 8 Drawing Sheets

(56) References Cited

U.S. PATENT DOCUMENTS

| | | |
|---|---|---|
| 2009/0115617 A1 | 5/2009 | Sano et al. |
| 2009/0169108 A1* | 7/2009 | Chou .......................... 382/190 |
| 2009/0171783 A1 | 7/2009 | Raju |
| 2010/0046842 A1* | 2/2010 | Conwell ..................... 382/218 |
| 2010/0235350 A1 | 9/2010 | Butler |
| 2011/0074970 A1* | 3/2011 | Sukegawa ................. 348/222.1 |

OTHER PUBLICATIONS

European Examination Report; Application No. 12170262.5; May 20, 2015; 4 pages.

Canadian Office Action; Application No. 2,817,258; Jul. 30, 2014; 3 pages.

Canadian Office Action; Application No. 2,817,258; May 29, 2015; 5 pages.

* cited by examiner

METHODS AND APPARATUS FOR USE IN MAPPING IDENTIFIED VISUAL FEATURES OF VISUAL IMAGES TO LOCATION AREAS

BACKGROUND

1. Field of the Technology

The present disclosure relates generally to techniques involving computer devices which are configured to capture and/or store visual images, such as photographic images.

2. Description of the Related Art

A computer device, such a portable battery-powered wireless telephony device, may be configured to connect in a communication network for communications. For example, such a device may be configured for communications in cellular telecommunication networks, and/or wireless local area networks (WLANs).

Such a device may be further configured to capture and/or store visual images, such as photographic images. A large number of visual images may be captured at different devices located at different locations. The visual images may include different visual features captured at these various locations. However, no means exists for efficiently assessing and sharing information pertaining to these visual features captured at the different locations.

There is a need for efficiently sharing information regarding visual images in these and similar environments.

BRIEF DESCRIPTION OF THE DRAWINGS

Embodiments of present disclosure will now be described by way of example with reference to attached figures, wherein.

DETAILED DESCRIPTION

In one illustrative example of the present disclosure, a computer device is configured to analyze image data of a visual image for identifying whether the visual image includes a visual feature; produce a message which includes a visual feature indication which indicates whether the visual image includes the visual feature and a location indication which indicates a location at which the visual image was captured; and send this message to a server. The server is configured to produce, for a plurality of location areas, an aggregate count or ratio of visual feature indications from a plurality of messages received from a plurality of computer devices for visual images captured within the same location area, and map the aggregate counts or ratios to location area indications corresponding to the location areas.

Example Environment.

Figure 1:
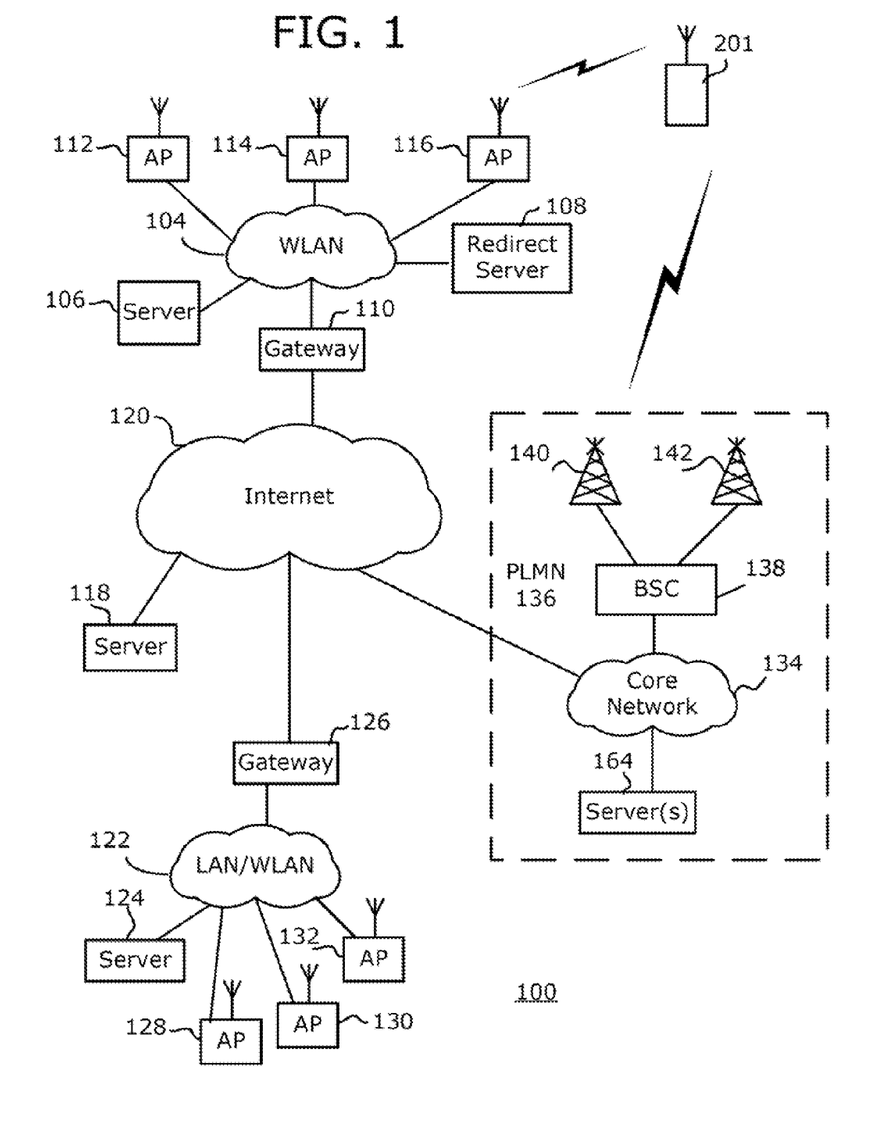
FIG. 1 is an illustrative representation of a communication system which includes communication networks within which a computer device may communicate.

To illustrate one environment within which the techniques of the present disclosure may be practiced, FIG. 1 illustrates a wireless communication device 201 which may communicate in a communication system 100. Wireless device 201 is one type of a computer device which may make use of the techniques of the present disclosure. In the communication system 100, wireless device 201 may communicate with one or more wireless communication networks. For example, wireless device 201 may communicate with a wireless communication network 104 which is a wireless local area network (WLAN). Here, wireless network 104 and wireless device 201 may operate in accordance with IEEE 802.11 standards.

In this example, wireless network 104 has a plurality of wireless access points (APs) 112, 114, and 116 for wireless communications with wireless device 201. WLANs may be identified by a wireless device 201 with use of a wireless network identifier which is communicated from the WLAN. The wireless network identifier may be, for example, a Set Service Identifier (SSID) or Extended SSID (ESSID). In this example, wireless network 104 includes one or more servers 106, a redirect server 108, and a gateway 110. Server 106 may provide data, applications, and/or functionality for communication services for wireless device 201.

Wireless network 104 may be a public Wi-Fi "hotspot" for public use, and include what may be referred to as a "captive portal" or "walled garden." For devices connected in wireless network 104 via one of wireless APs 112, 114, and 116, gateway 110 is configured to permit or deny access to the data, applications, and/or functionality, as well as to permit or deny external access outside of wireless network 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in wireless network 104 is made prior to proper authorization, gateway 110 is configured to redirect the request to redirect server 108. In response, redirect server 108 is configured to respond to wireless device 201 to provide data for producing information (e.g., Web page information) which is rendered in a visual display of wireless device 201 via a Web browser application. The information may solicit a user response. For example, the information may solicit a user registration or login with user fields for entering a user name and/or password information. Gateway 110 identifies whether the received user response is sufficient (e.g., whether the user name and password match stored user name and password information, whether the user payment is accepted, whether the user acceptance is confirmed, etc.). If the user response is deemed sufficient, gateway 110 permits access to the data, applications, and/or functionality in or outside of wireless network 104.

Wireless device 201 may also operate for communications in other different wireless networks, such as a wireless network 122 which is also a WLAN. In this example, wireless network 122 is a private communication network of an enterprise (e.g., an organization, a company, a corporation, etc.) of wireless device 201. Similar to wireless network 104, wireless network 122 has a plurality of wireless APs 128, 130 and 132, one or more servers 124, and a gateway 126. For devices connected in wireless network 122 via one of wireless APs 128, 130, and 132, gateway 126 may be configured to permit or deny access to the data, applications, and/or functionality offered via wireless network 122 depending on whether or not a device has been authorized and what access rights are given upon authorization. For devices attempting to access wireless network 122 via Internet 120, gateway 126 is configured to permit or deny internal access to the data, applications, and/or functionality in wireless network 122.

Such wireless networks (e.g., infrastructure WLANs) may provide or allow access to various data and communication services to its terminals. For example, the wireless networks may provide for communication access to Internet 120 via the Web browser application, or voice telephony communication service with use of Voice over IP (VoIP) communication, or other communication services. For "push-type" data or message synchronization services, for example, wireless device 201 may be enabled to maintain data synchronization with a server (e.g., server 106 or 118) for user data of an application associated with a user account. The application of wireless device 201 and the server may be or include, for example, an electronic mail (e-mail) application program for the communication of e-mail messages.

Wireless device 201 may be additionally configured to access communication services via a Public Land Wireless Network (PLMN) 136 (e.g., a cellular telecommunications network). PLMN 136 includes a core network 134, a plurality of base station controllers such as a base station controller (BSC) 138 coupled to core network 134, and a plurality of base stations such as a base station (BS) 140 and a base station 142 coupled to associated BSCs 138. Core network 134, BSC 138, and BS 140 operate in a conventional fashion as well-documented. Other PLMNs in the environment have a similar or the same architecture as PLMN 136. For communication with PLMNs, wireless device 201 may be configured in accordance with one or more cellular telecommunication standards, such as Global Systems for Mobile (GSM) and/or General Packet Radio Service (GPRS) technologies. However, such wireless device may additionally or alternatively operate in accordance with other such cellular standards, such as Enhanced Data rates for GSM Evolution (EDGE) or Enhanced GPRS (EGPRS), Universal Mobile Telecommunications System (UMTS), Long-Term Evolution (LTE), or EVolution-Data Only (EV-DO) (for CDMA) technologies, as a few examples.

Figure 2:
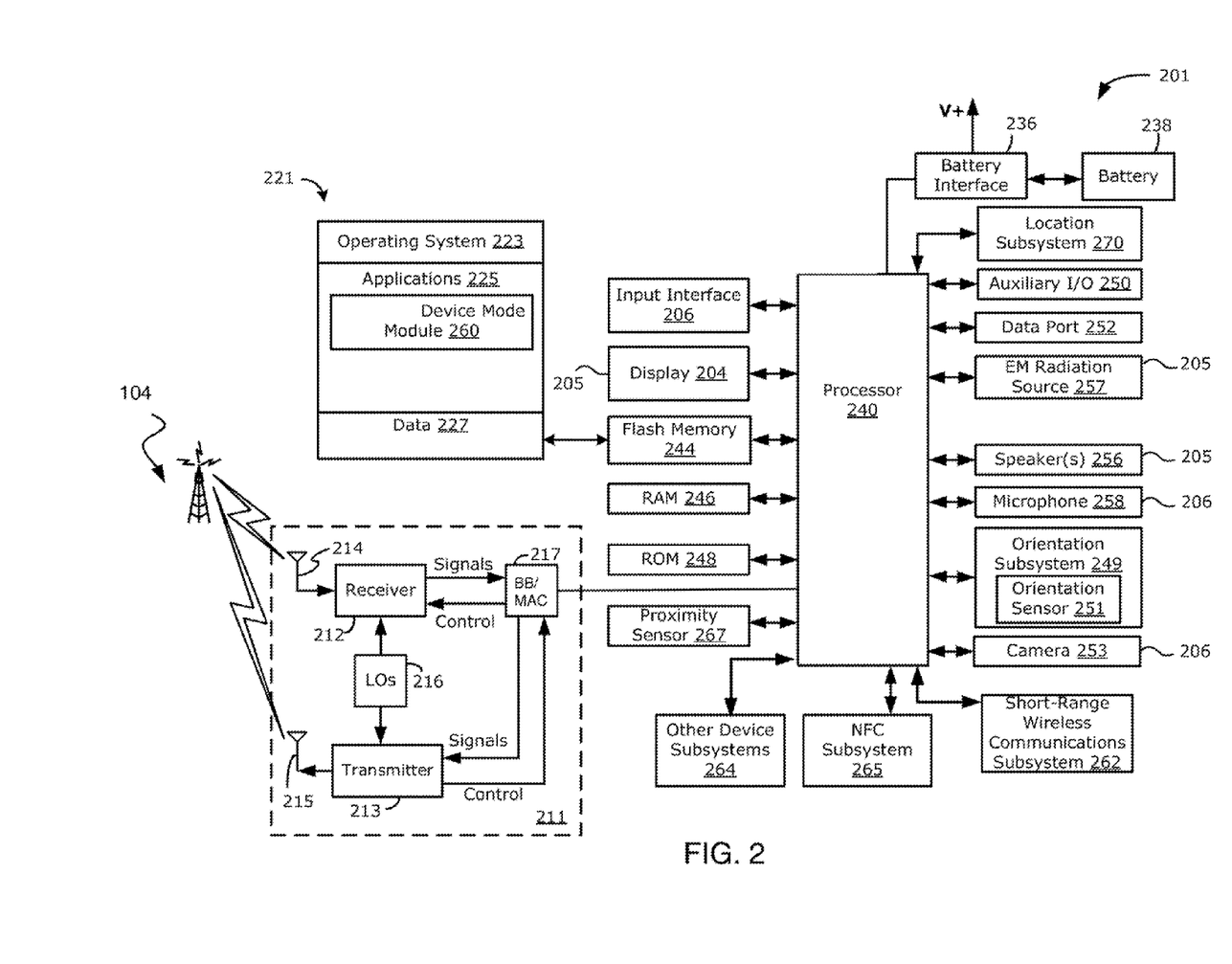
FIG. 2 is an example of a schematic block diagram of the computer device of FIG. 1.

Reference will now be made to FIG. 2 which illustrates one example of a schematic block diagram of wireless device 201. In the illustrated example, wireless device 201 is a communication device and, more particularly, is a mobile communication device having data and voice communication capabilities, and configured to communicate with other computer systems (e.g., via the Internet). It will, however, be appreciated that wireless device 201 may take other forms.

Depending on the functionality provided by wireless device 201, in various examples, wireless device 201 may be a multiple-mode communication device configured for both data and voice communication, a mobile telephone, such as a smartphone, a wearable computers such as a watch, a tablet computer such as a slate so computer, a personal digital assistant (PDA), or a computer system. Wireless device 201 may take other forms apart from those specifically listed above. The electronic device may also be referred to as a mobile communications device, a communication device, a mobile device and, in some cases, as a device.

Wireless device 201 includes a controller including one or more processors 240 (such as a microprocessor) which controls the overall operation of wireless device 201. The processor 240 interacts with device subsystems such as a wireless communication subsystem 211 for exchanging radio frequency signals with wireless network 104 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touch-screen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range wireless communication subsystem 262 and other device subsystems generally designated as 264. Some of the subsystems shown in FIG. 2 perform communication-related functions, whereas other subsystems may provide "resident" or on-device functions.

In at least some examples, wireless device 201 may include a touchscreen display which acts as both an input interface 206 (i.e., touch-sensitive overlay) and an output interface 205 (i.e., display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some examples, the touch-sensitive overlay may have a touch-sensitive input surface which is larger than the display 204. For example, in at least some examples, the touch-sensitive overlay may extend overtop of a frame 312 (of FIG. 3) which surrounds the display 204. In such example, the frame 312 (of FIG. 3) may be referred to as an active frame since it is capable of acting as an input interface 206. In at least some examples, the touch-sensitive overlay may extend to the sides of wireless device 201.

As noted above, in some examples, wireless device 201 may include a communication subsystem 211 which allows wireless device 201 to communicate over wireless network 104. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to wireless device 201 and a single antenna may be shared by both receiver and transmitter. The particular design of the wireless communication subsystem 211 depends on wireless network 104 in which wireless device 201 is intended to operate.

In at least some examples, wireless device 201 may communicate with any one of a plurality of stations or access points (APs) of wireless network 104 within its geographic coverage area. Wireless device 201 may send and receive communication signals over wireless network 104 after the required network registration or activation procedures have been completed. Signals received by the antenna 214 through wireless network 104 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to wireless network 104 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some examples, the auxiliary input/output (I/O) subsystems 250 may include an external communication link or interface; for example, an Ethernet connection. Wireless device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on wireless device 201 such as receipt of an electronic communication or incoming phone call, or for other purposes such as haptic feedback (touch feedback).

The data port 252 may be used for synchronization with a user's host computer system (not shown). The data port 252 enables a user to set preferences through an external device or software application and extends the capabilities of wireless device 201 by providing for information or software downloads to wireless device 201 other than through wireless network 104. The alternate download path may for example, be used to load an encryption key onto wireless device 201 through a direct, reliable and trusted connection to thereby provide secure device communication.

In at least some examples, wireless device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some examples, the orientation sensor 251 is an accelerometer, such as a three-axis accelerometer. An accelerometer is a sensor which converts acceleration from motion (e.g., movement of the device 201 or a portion thereof due to the strike force) and gravity which are detected by a sensing element and converted into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of wireless device 201. The orientation data, in at least some examples, specifies the orientation of the device 201 relative to the gravitational field of the earth.

In some examples, the orientation subsystem 249 may include other orientation sensors 251, instead of or in addition to accelerometers. For example, in various examples, the orientation subsystem 249 may include a gravity sensor, a gyroscope, a tilt sensor, an electronic compass or other suitable sensor, or combinations thereof. In some examples, the device orientation subsystem 249 may include two or more orientation sensors 251 such as an accelerometer and an electronic compass.

Wireless device 201 may, in at least some examples, include a near field communications (NFC) subsystem 265. The NFC subsystem 265 is configured to communicate with other wireless devices 201 and/or tags, using an NFC communications protocol. NFC is a set of short-range wireless technologies which typically require a distance of 4 cm or less for communications. The NFC subsystem 265 may include an NFC chip and an NFC antenna.

Wireless device 201 may include a microphone and/or one or more speakers. In at least some examples, wireless device 201 may include a plurality of speakers 256. For example, in some examples, wireless device 201 may include two or more speakers 265. The two or more speakers 256 may, for example, be disposed in spaced relation to one another. That is, in at least some examples, wireless device 201 may include a first speaker and a second speaker and the first speaker and the second speaker may be spatially separated from one another within wireless device 201. In at least some examples, the display 204 may be disposed between the first speaker and the second speaker of the electronic device. In such example, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In at least some examples, each speaker 256 may be associated with a separate audio channel. The multiple speakers may, for example, be used to provide stereophonic sound (which may also be referred to as stereo).

Wireless device 201 may also include one or more cameras 253. The one or more cameras 253 may be capable of capturing images in the form of still photographs or motion video. In at least some examples, wireless device 201 includes a front facing camera 253. A front facing camera 253 is a camera which is generally located on a front face of wireless device 201. The front face is typically the face on which a display 204 is mounted. That is, the display 204 is configured to display content which may be viewed from a side of wireless device 201 where the camera 253 is directed. The front facing camera 253 may be located anywhere on the front surface of the electronic device; for example, the camera 253 may be located above or below the display 204. Alternatively, or additionally, camera 253 may be located on a rear face of wireless device 201. The camera 253 may be a fixed position camera which is not movable relative to the display 204 of wireless device 201 and/or the housing of wireless device 201. In such examples, the direction of capture of the camera is always predictable relative to the display 204 and/or the housing. In at least some examples, the camera may be provided in a central location relative to the display 204 to facilitate image acquisition of a face.

In at least some examples, wireless device 201 includes an electromagnetic (EM) radiation source 257. In at least some examples, the EM radiation source 257 is configured to emit electromagnetic radiation from the side of the electronic device which is associated with a camera 253 of that wireless device 201. For example, where the camera is a front facing camera 253, wireless device 201 may be configured to emit electromagnetic radiation from the front face of wireless device 201. That is, in at least some examples, the electromagnetic radiation source 257 is configured to emit radiation in a direction which may visible by the camera. That is, the camera 253 and the electromagnetic radiation source 257 may be disposed on wireless device 201 so that electromagnetic radiation emitted by the electromagnetic radiation source 257 is visible in images obtained by the camera.

In some examples, the electromagnetic radiation source 257 may be an infrared (IR) radiation source which is configured to emit infrared radiation. In at least some examples, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some examples, the camera 253 is configured to capture at least some electromagnetic radiation which is not in the visible spectrum.

In some examples, wireless device 201 is provided with a service routing application programming interface (API) which provides an application with the ability to route traffic through a serial data (i.e., USB) or BLUETOOTH® (BLUETOOTH® is a registered trademark of Bluetooth SIG, Inc.) connection to a host computer system using standard connectivity protocols. When a user connects their wireless device 201 to the host computer system via a USB cable or BLUETOOTH® connection, traffic that was destined for wireless network 104 is automatically routed to wireless device 201 using the USB cable or BLUETOOTH® connection. Similarly, any traffic destined for wireless network 104 is automatically sent over the USB cable BLUETOOTH® connection to the host computer system for processing.

Wireless device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in wireless device 201, and the battery interface 236 provides a mechanical and electrical connection for the battery 238. The battery interface 236 is coupled to a regulator (not shown) which provides a regulated voltage V to the circuitry for powering wireless device 201.

Wireless device 201 includes a short-range communication subsystem 262 which provides for wireless communication between wireless device 201 and other wireless devices 201. The short-range communication subsystem 262 may be used to provide a preferred device mode between wireless device 201 and another wireless device 201 which may, in at least some examples, be a wireless device which is the same or similar to wireless device 201 discussed with reference to FIG. 1. In at least some examples, the short-range communication subsystem 262 is a wireless bus protocol compliant communication mechanism such as a BLUETOOTH® communication module to provide for communication with similarly-enabled systems and devices.

Wireless device 201 stores data 227 in an erasable persistent memory, which in one example is the flash memory 244. In various examples, the data 227 includes service data including information required by wireless device 201 to establish and maintain communication with wireless network 104. The data 227 may also include user application data such as email messages, address book and contact information, calendar and schedule information, notepad documents, image files, and other commonly stored user information stored on wireless device 201 by its user, and other data. The data 227 stored in the persistent memory (e.g., flash memory 244) of wireless device 201 may be organized, at least partially, into one or more databases or data stores. The databases or data stores may contain data items of the same data type or associated with the same application. For example, email messages, contact records, and task items may be stored in individual databases within the device memory.

Wireless device 201 may, in some examples, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of wireless device 201 may also compose data items, such as email messages; for example, using the input devices in conjunction with the display 204. These composed items may be transmitted through the communication subsystem 211 over wireless network 104.

In the voice communication mode, wireless device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on wireless device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 2, the software modules 221 include operating system software 223 and other software applications 225 such as device mode module 260. In the example of FIG. 2, the device mode module 260 is implemented as a stand-alone application 225. However, in other examples, the device mode module 260 could be implemented as part of the operating system 223 or another application 225.

The software applications 225 on wireless device 201 may also include a range of additional applications, including for example, a notepad application, Internet browser application, voice communication (i.e., telephony) application, mapping application, or a media player application, or any combination thereof. Each of the software applications 225 may include layout information defining the placement of particular fields and graphic elements (e.g., text fields, input fields, icons, etc.) in the user interface (e.g., the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on wireless device 201 during or after manufacture. Additional applications and/or upgrades to the operating system 223 or software applications 225 may also be loaded onto wireless device 201 through wireless network 104, the auxiliary I/O subsystem 250, the data port 252, the short-range communication subsystem 262, or other suitable subsystem 264. The downloaded programs or code modules may be permanently installed; for example, written into the program memory (i.e., the flash memory 244), or written into and executed from the RAM 246 for execution by the processor 240 at runtime.

Example Smartphone Electronic Device.

Figure 3:
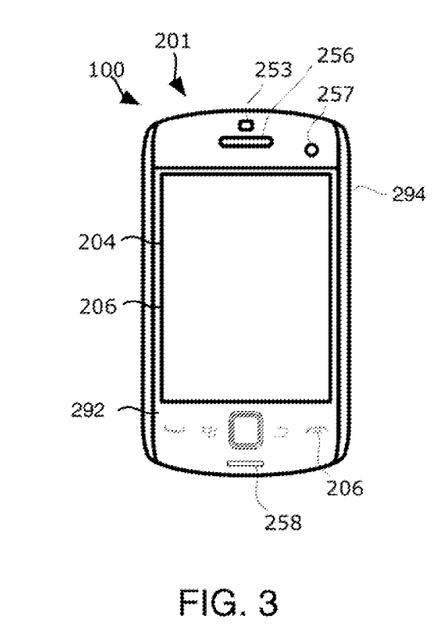
FIGS. 3 and 4 are some examples of different types of computer devices of the present disclosure, which include a smartphone (FIG. 3) and a tablet computer (FIG. 4)

Referring now to FIG. 3, a front view of an example wireless device 201 which is a smartphone 300 is illustrated. The smartphone 300 is a mobile phone which offers more advanced computing capability than a basic non-smartphone cellular phone. For example, the smartphone 300 may have the ability to execute third party applications which are stored on the smartphone.

The smartphone 300 may include the components discussed above with reference to FIG. 2 or a subset of those components. The smartphone 300 includes a housing 294 which houses at least some of the components discussed above with reference to FIG. 2.

In the example illustrated, the smartphone includes a display 204, which may be a touchscreen display which acts as an input interface 206. The display 204 is disposed within the smartphone 300 so that it is viewable at a front side 292 of the smartphone 300. That is, a viewable side of the display 204 is disposed on the front side 292 of the smartphone. In the example illustrated, the display 204 is framed by the housing 294.

The example smartphone 300 also includes other input interfaces 206 such as one or more buttons, keys or navigational input mechanisms. In the example illustrated, at least some of these additional input interfaces 206 are disposed for actuation at the front side 292 of the smartphone.

The example smartphone also includes a speaker 256. In the example illustrated, the smartphone includes a single speaker 256 which is disposed vertically above the display 204 when the smartphone 300 is held in a portrait orientation where its height is longer than its width. The speaker 256 may be disposed on the front face of the smartphone 300.

While the example smartphone 300 of FIG. 3 includes a single speaker 256, in other examples, the smartphone 300 may include a greater number of speakers 256. For example, in at least some examples, the smartphone 300 may include a second speaker 256 which is disposed vertically below the display 204 when the smartphone is held in a portrait orientation where its height is longer than its width (i.e., the orientation illustrated in FIG. 3).

The example smartphone 300 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 300 also includes a front facing camera 253 which may be located vertically above the display 204 when the smartphone 300 is held in a portrait orientation where its height is longer than its width. The front facing camera 253 is located so that it may capture images of objects which are located in front of and/or surrounding the front side of the smartphone 300.

The example smartphone 300 also includes an electromagnetic radiation source 257. The electromagnetic radiation source 257 is disposed on the front side 292 of the smartphone 300. In this orientation, electromagnetic radiation which is produced by the electromagnetic radiation source 257 may be projected onto objects which are located in front of and/or surrounding the front side of the smartphone 300. Such electromagnetic radiation (or the projection of electromagnetic radiation onto objects) may be captured on images obtained by the camera 253.

Example Tablet Electronic Device.

Figure 4:
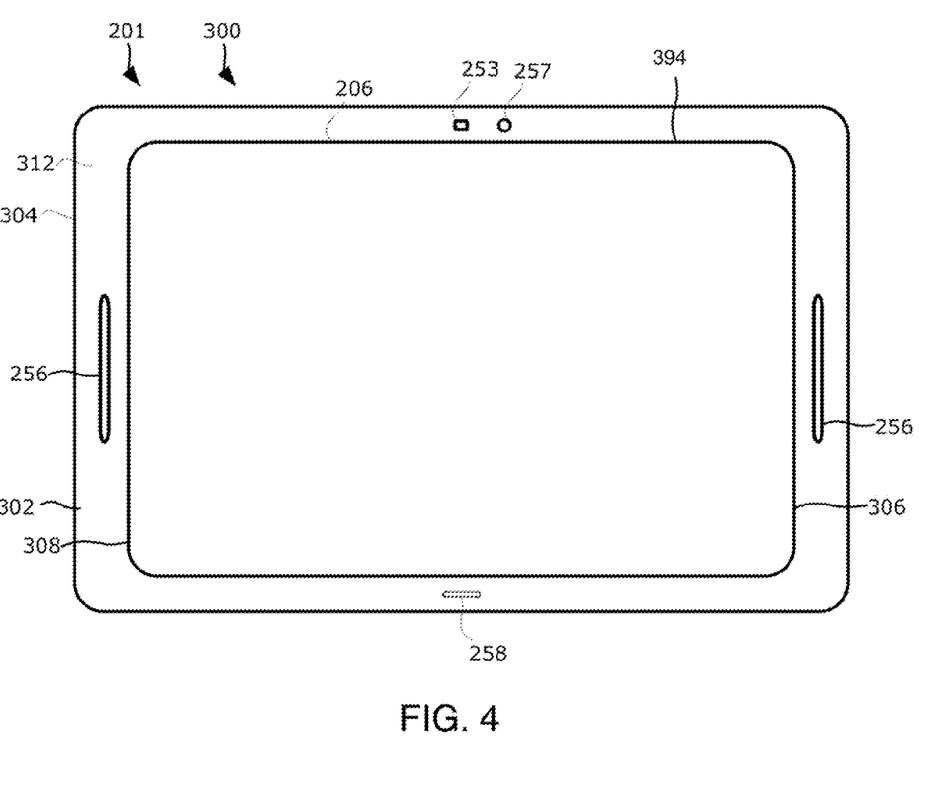

The wireless device may be a tablet computer 400 ("tablet"), one of which is illustrated in FIG. 4. Tablet computer 400 of FIG. 4 may include many of the same features and components of the smartphone 300 of FIG. 3. However, tablet computer 400 of FIG. 4 is generally larger than the smartphone 300 of FIG. 3. Tablet computer 400 may include the components discussed above with reference to FIG. 2 or a subset of those components. Tablet computer 400 includes a housing 394 which houses at least some of the components discussed above with reference to FIG. 2.

Tablet computer 400 includes a display 304, which may be a touchscreen display which acts as an input interface 206. The display 304 is disposed within tablet computer 400 so that it is viewable at a front side 302 of tablet computer 400. That is, a viewable side of the display 304 is disposed on the front side 302 of tablet computer 400. In the example illustrated, the display 304 is framed by the housing 394, with use of a frame 312 which surrounds the display 304. The frame 312 is portion of the housing 394 which provides a border around the display 304. In at least some examples, the frame 312 is an active frame 312. That is, the frame has a touch sensitive overlay which allows wireless device 201 to detect a touch applied to the frame, thereby allowing the frame 312 to act as an input interface 206 (of FIG. 2).

The example tablet computer 400 includes a plurality of speakers 256. In the example illustrated, the tablet includes two speakers 256. The two speakers 256 are disposed on opposing sides of the display 304. More particularly, when tablet computer 400 is held in a landscape orientation (such as the orientation illustrated in FIG. 4) where its width is longer than its height, one of the two speakers is disposed on a right side 306 of the display 304 and one of the speakers is disposed on the left side 308 of the display 304. Both speakers 256 are disposed on the front side 302 of tablet computer 400.

The example tablet computer 400 also includes a microphone 258. In the example illustrated, the microphone 258 is vertically disposed below the display 304 when the tablet computer is held in the landscape orientation illustrated in FIG. 4. The microphone 258 may be located in other locations in other examples.

The example tablet computer 400 also includes a front facing camera 253 which may be located vertically above the display 304 when tablet computer 400 is held in a landscape orientation (i.e., the orientation of FIG. 3). The front facing camera 253 is located so that it may capture images of objects which are located in front of and/or surrounding the front side of tablet computer 400.

The example tablet computer 400 also includes an electromagnetic radiation source 257. The electromagnetic radiation source 257 is disposed on the front side 304 of tablet computer 400. In this orientation, electromagnetic radiation which is produced by the electromagnetic radiation source 257 may be projected onto objects which are located in front of and/or surrounding the front side 302 of tablet computer 400. Such electromagnetic radiation (or the projection of electromagnetic radiation onto objects) may be captured on images obtained by the camera 253.

Although a specific wireless device 201 has just been described for use with the techniques of the present disclosure, any suitable device may be utilized. For example, a camera which may be a digital single-lens reflex (DSLR) camera or a "point-and-shoot" camera that records images to a memory card (e.g., flash card) and subsequently copied to a computer for further processing per the present techniques may be employed.

Figure 5:
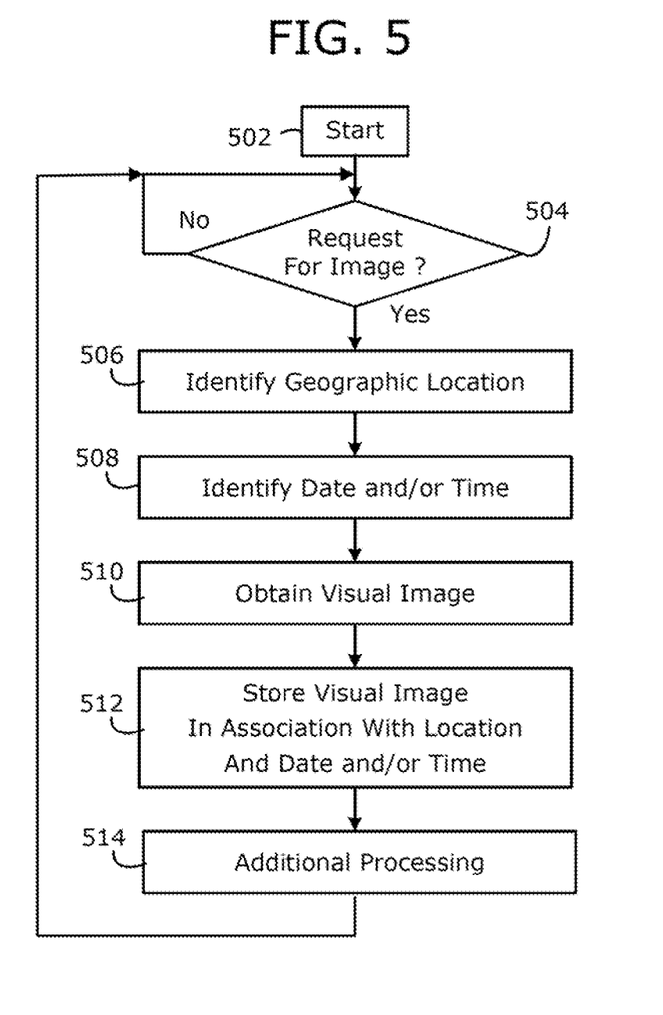
FIG. 5 is a flowchart for describing an example method in a computer device for use in mapping identified visual features of visual images to location areas.

FIG. 5 is a flowchart for describing a method in a computer device for use in mapping identified visual features of visual images to location areas. The method of FIG. 5 may be performed by wireless device 201 described in relation to FIGS. 1-4 above. This device may include a module for capturing visual images, such as a camera module for capturing photographic images (see e.g., description in relation to FIG. 2, camera 206/253). The techniques described in relation to the flowchart of FIG. 5 may be performed by one or more controllers or processors of the device along with its wireless or RF transceiver(s). A computer program product which may embody the technique may include a computer readable medium (e.g., memory of the communication device, computer disk, CD-ROM, etc.) having computer instructions stored therein which are executable by the one or more processors of the device for performing the technique.

Beginning at a start block 502 of FIG. 5, the device identifies whether a request to produce a visual image has been received or detected (step 504 of FIG. 5). The request may be, for example, a request received via a user interface of the device. In addition, the request may be a request to capture a photographic image with use of the camera module of the device (see e.g., description in relation to FIG. 2, camera 206/253).

If a request has been received or detected in step 504, then the device identifies its current geographic location (step 506 of FIG. 5). The geographic location represents the location at which the visual image has been or will be produced or captured at the device.

The current geographic location of the device may be obtained through use of a Global Positioning System (GPS) module of the device. The current geographic location may include latitude and longitude coordinates, but other information may be or include altitude, bearing, distance, accuracy data, and/or place names. The association of geographic location with visual images may be or be referred to as "geotagging". Alternatively, the geographic location may be a current address at which the wireless device 201 is currently located.

The device also identifies a current date and/or time (step 508 of FIG. 5). This current date and/or time represents the date and/or time at which the device has or will capture the visual image.

The device then obtains the visual image (step 510 of FIG. 5). In this step, the device may obtain a photographic image by commanding the camera module to capture the photographic image. The visual image that was captured in step 510 is then stored in memory of the device (step 512 of FIG. 5). The visual image may be stored in association with the current location and the current date and/or time obtained in steps 506 and 508. Thus in steps 510 and 512, the device may capture and "geotag" the image with location data corresponding to its current location.

The device then performs additional processing (step 514 of FIG. 5). This additional processing may be the processing as described below in relation to FIG. 6. The method of FIG. 5 repeats, at step 504 for additional requests for producing visual images at the device.

Note that, in some examples, step 514 is performed at a different time than that depicted in FIG. 5. For example, step 514 may be performed in response to detecting or identifying a predetermined condition or event, such as identifying when a predetermined number of visual images have been newly captured, in response to an expiration of a timer after a plurality of new visual images have been captured and/or saved, or in response to a request received via the user interface of the device or the communication subsystem of the device.

Figure 6:
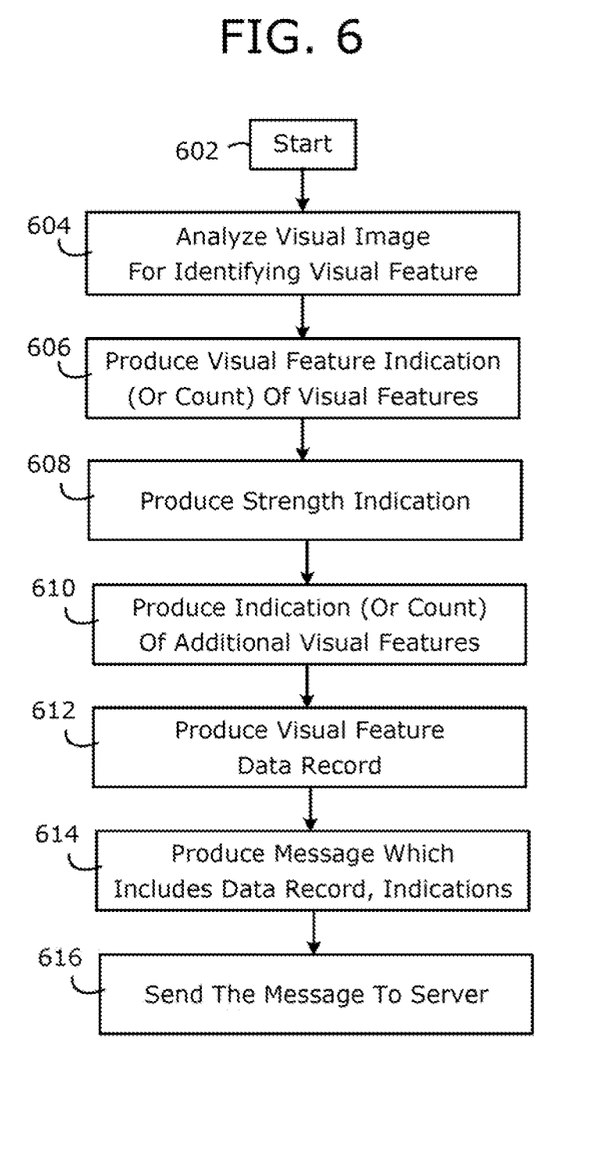
FIG. 6 is another flowchart for describing a further method in the computer device for use in mapping identified visual features of visual images to location areas.

FIG. 6 is another flowchart for describing a further method in the computer device for use in mapping identified visual features of visual images to location areas. As described earlier above, the device may execute the steps of FIG. 6 in the context of the additional processing of step 514 of FIG. 5. In some examples, the steps of FIG. 6 may be performed at a different time than that depicted in FIG. 5, such as when a predetermined number of visual images have been newly captured, or in response to an expiration of a timer when new visual images have already been captured.

Beginning at a start block 602 of FIG. 6, the device analyzes image data of the visual image for identifying whether the visual image includes a visual feature (step 604 of FIG. 6). The visual feature may be any suitable visual feature of interest.

In some examples, the visual feature is a facial expression indicative of mood of a person. For example, the facial expression may be a "smile" which is indicative of a "happy" mood. Other alternative facial expressions may be identified, such as a yawn or a frown, for example, or expressions indicative of sadness, anger, surprise, disgust, fear, confusion, excitement, desire, or contempt, as other examples.

In other examples, the visual feature may be or include an object, for example. The object may be any animate or inanimate object, such as a cell phone, the sun, a cloud, a dog, a tree, a guitar, a skyscraper building, etc.

Next, the device produces, based on the analyzing, a visual feature indication indicating whether the visual image includes the visual feature (step 606 of FIG. 6). In some examples, the visual feature indication may be or include a count of how many times the visual feature has been identified in the visual image.

The device may also produce a strength indication indicating the strength regarding the accuracy of whether the visual image includes this visual feature (step 608 of FIG. 6). The strength indication is provided to indicate an accuracy and/or inaccuracy of detection, as there may be some uncertainty as to whether the visual feature was indeed accurately detected, as it may be relatively small and/or difficult to accurately detect.

The strength indication may be a value (e.g., a value from 1 to 10, or 1 to 100) or a percentage indicative of the strength. In some examples, there is a strength indication for each visual feature identified in the visual image; alternatively, there is a single strength indication for all visual features identified in the visual image.

Figure 8:
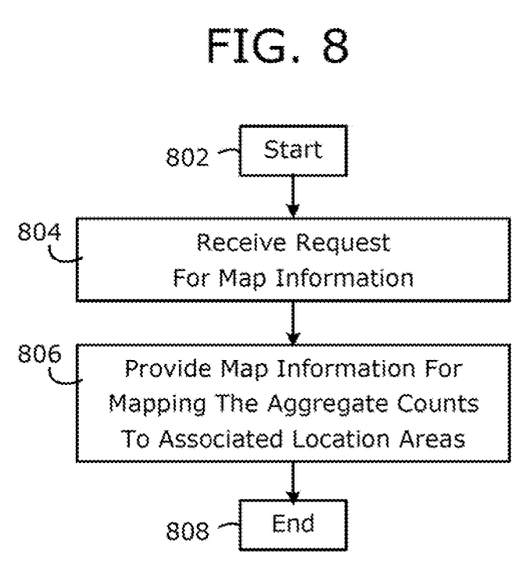
FIG. 8 is still yet another flowchart for describing a further method in the server for use in mapping identified visual features of visual images to location areas.

The device may: also produce an additional visual feature indication indicating whether the visual image includes an additional visual feature (step 610 of FIG. 8). Any additional visual feature indication may be or include a count of how many times the additional visual feature has been identified in the visual image. Note that a plurality of additional visual feature indications for a plurality of additional visual features may be produced.

In some examples, especially where the visual feature indication is a facial expression indicative of mood (e.g., a "smile"), the additional visual feature identified in the visual image may be a human face. Here, the additional visual feature indication may be or include a count of the number of times the visual image includes the face. In such examples, a ratio or percentage of "facial expressions to faces" may be determined from the count of the facial expressions (e.g., smiles) to the total number of human faces in the visual image. This may be viewed as how relatively happy people are in the visual image.

Smile and/or face detection in a captured photographic image may be performed with use of any suitable detection technique. For example, many algorithms implement face detection as a binary pattern-classification task (i.e., classifying the members of a given set of objects into two groups on the basis of whether they have some property or not). The content of a given part of an image is transformed into features, after which a classifier (e.g., which is trained on example faces) decides whether that particular region of the image is a face or not. A window-sliding technique over the image may be employed. The classifier may be used to classify the (usually square or rectangular) portions of an image, at all locations and scales, as either faces or non-faces (background pattern).

One or more "face models" which contain the appearance and shape of a face may be utilized for such classification. There are several shapes of faces; common ones are oval, rectangle, round, square, heart, and triangle shapes. The models may be passed over the image to identify faces. On the other hand, a face characteristic may be found based on a match of skin color (e.g., using a plurality of different skin colors). Further, a combined approach may be utilized, e.g., detecting color, shape, and/or texture. For example, a skin color model may be employed first to select objects of that color, and then face models may be employed with the selected objects to eliminate false detections from the color models and/or to extract facial features such as eyes, nose, and mouth. Detection of smiles and/or other facial expressions may be performed in the same or similar fashion.

The device produces a visual image data record which includes the indications of steps 606, 608, and/or 610 (step 612 of FIG. 6). The visual image data, record may include additional or alternative indications in additional or alternative fields of the data record. Additional or alternative indications may be or include a computer device identifier which uniquely identifies the computer device or user associated with the visual image data record (e.g., a hardware address, a telephone number, or an e-mail address of the computer device); a visual image identifier which uniquely identifies or names the data record or visual image (e.g., the name of the file of the visual image); and a visual feature identifier which uniquely identifies or names the visual feature (e.g., a smile, the sun, a dog). Note that a plurality of visual feature identifiers and visual feature indications may be provided in a single data record associated with the visual image.

The device then produces a message which includes the visual image data record (step 614 of FIG. 6). The device then sends the message which includes the visual image data record to a server (step 616 of FIG. 6). The message may be suitably formatted for delivery via the communication network within which the device is connected. Where the computer device is a wireless communication device configured to communicate in a wireless communication network, the device sends the message to the server by wirelessly transmitting the message to the server via the wireless communication network. The method of FIG. 6 may be repeated for each additional visual image.

Note that the device sends the message to the server without (ever) sending the visual image itself. In other examples, however, the device also sends the visual image to the server.

As will be described in relation to FIG. 7 below, the server is configured to receive a plurality of such messages from a plurality of computer devices, for producing an aggregate count of visual feature indications for visual images captured at the same location.

Figure 7:
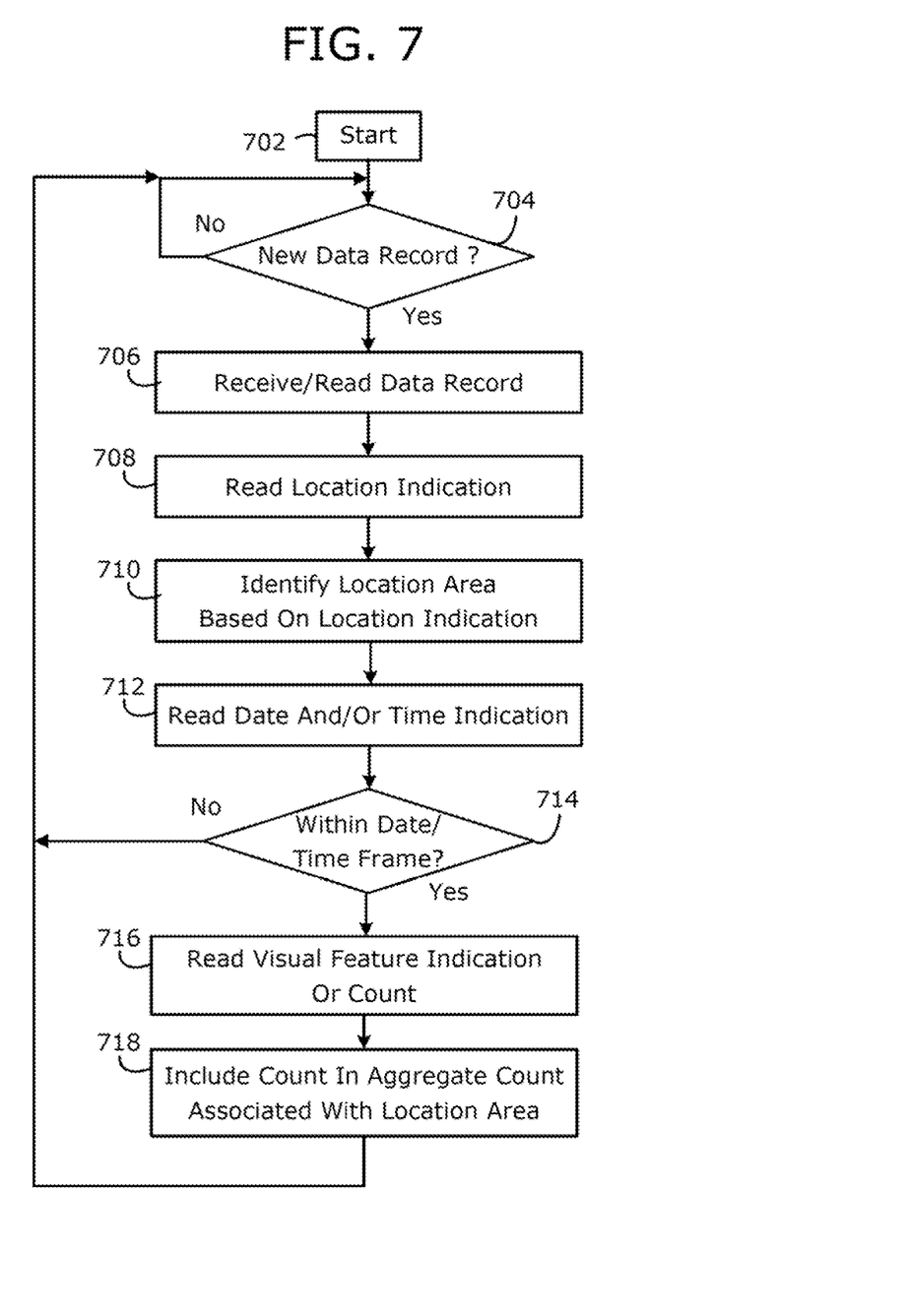
FIG. 7 is yet another flowchart for describing an example method in a server for use in mapping identified visual features of visual images to location areas.

FIG. 7 is a flowchart for describing a method in a server for use in mapping identified visual features of visual images to location areas. The method of FIG. 7 may be performed by server 118 described in relation to FIG. 1 above. The techniques described in relation to the flowchart of FIG. 7 may be performed by one or more controllers or processors of the server. A computer program product which may embody the technique may include a computer readable medium (e.g., memory of the communication device, computer disk, CD-ROM, etc.) having computer instructions stored therein which are executable by the one or more processors of the server for performing the technique.

Beginning at a start block of FIG. 7, the server identifies whether a new visual image data record is identified or received (step 704 of FIG. 7). A new visual image data record may be identified from, for example, a new message received from a computer device as described earlier in relation to step 616 of FIG. 6. Note that the server may receive the message from the device without (ever) receiving the visual image itself.

If there is a new visual image data record identified in step 704, then the server receives and/or reads the data record (step 706 of FIG. 7). In particular, the server reads from the data record the location indication which indicates the location at which the visual image was captured (step 708 of FIG. 7). The device then identifies which location area the location indication or location should be associated with or grouped into (step 710 of FIG. 7). In general, the location area is larger than and encompasses a plurality of locations. The location area may be a city, state, province, or country, as examples. In other examples, the location area is the name of an establishment, such as a restaurant, bar, company, school, or the like.

The server also reads from the data record the date and/or time indication which indicates the date and/or time at which the visual image was captured (step 712 of FIG. 7). The device then identifies whether the date and/or time should be associated with or grouped into the date and/or time frame of interest (step 714 of FIG. 7). In general, the frame of interest encompasses a plurality or a range of times or dates. The frame of interest may be a current date and/or time frame of interest. The frame of interest may be the daytime or nighttime hours of a particular day, the weekend, the past week, or the past month, as examples.

If yes in step 714, the visual feature indication (or count) is read from the data record (step 716 of FIG. 7) and included in the aggregate count associated with the location area (step 718 of FIG. 7). Here, the aggregate count associated with the location area is incremented, as many times as is indicated. Other aggregate counts may be incremented as well. If no in step 714, the visual feature indication or count is excluded from the aggregate count. The method then repeats beginning again at step 704 for yet another new visual image data record, which may be received from a different message and/or a different computer device.

Thus, for data records indicating locations within the same location area, the technique counts the number of times the visual feature is indicated by the visual feature indications in the data records, for producing an aggregate count of the visual features identified within the same location area. Such counting is repeated and/or performed for a plurality of different location areas. The aggregate counts may be stored in association with the location indications and/or location area indications. At any given time, these aggregate counts (or ratios or percentages based on such aggregate counts) may be mapped to the location area indications corresponding to the location areas.

In some examples, the server may be alternatively or additionally configured to interact with computer devices directly, performing the additional processing of step 514 of FIG. 5

(i.e., the steps of FIG. 6), and produce and save the data records in its own memory for processing in relation to FIG. 7.

FIG. 8 is still yet another flowchart for describing the method in the server for use in mapping identified visual features of visual images to location areas. The method of FIG. 8 may be performed by the server with use of the aggregate counts stored in association with the location indications or location area indications corresponding to the location areas. The techniques described in relation to the flowchart of FIG. 8 may be performed by one or more controllers or processors of the server. A computer program product which may embody the technique may include a computer readable medium (e.g., memory of the communication device, computer disk, CD-ROM, etc.) having computer instructions stored therein which are executable by the one or more processors of the server for performing the technique.

Beginning at a start block 802, a request for map information is received at the server (step 804 of FIG. 8). The request may specify or include one or more names of locations or location areas, or location coordinates, and/or a visual feature of interest, for example. In response to the request, the server provides map information for mapping the aggregate counts to location area indications corresponding to various location areas (step 806 of FIG. 8). Alternatively, ratios or percentages based on these aggregate counts may be mapped to the location area indications corresponding to the location areas. The flowchart of FIG. 8 ends at an end block 808, but may be repeated for subsequent requests. Note that FIG. 9 is an illustrative example of a mapping 900 which may be provided by the technique of FIG. 8.

Figure 9:
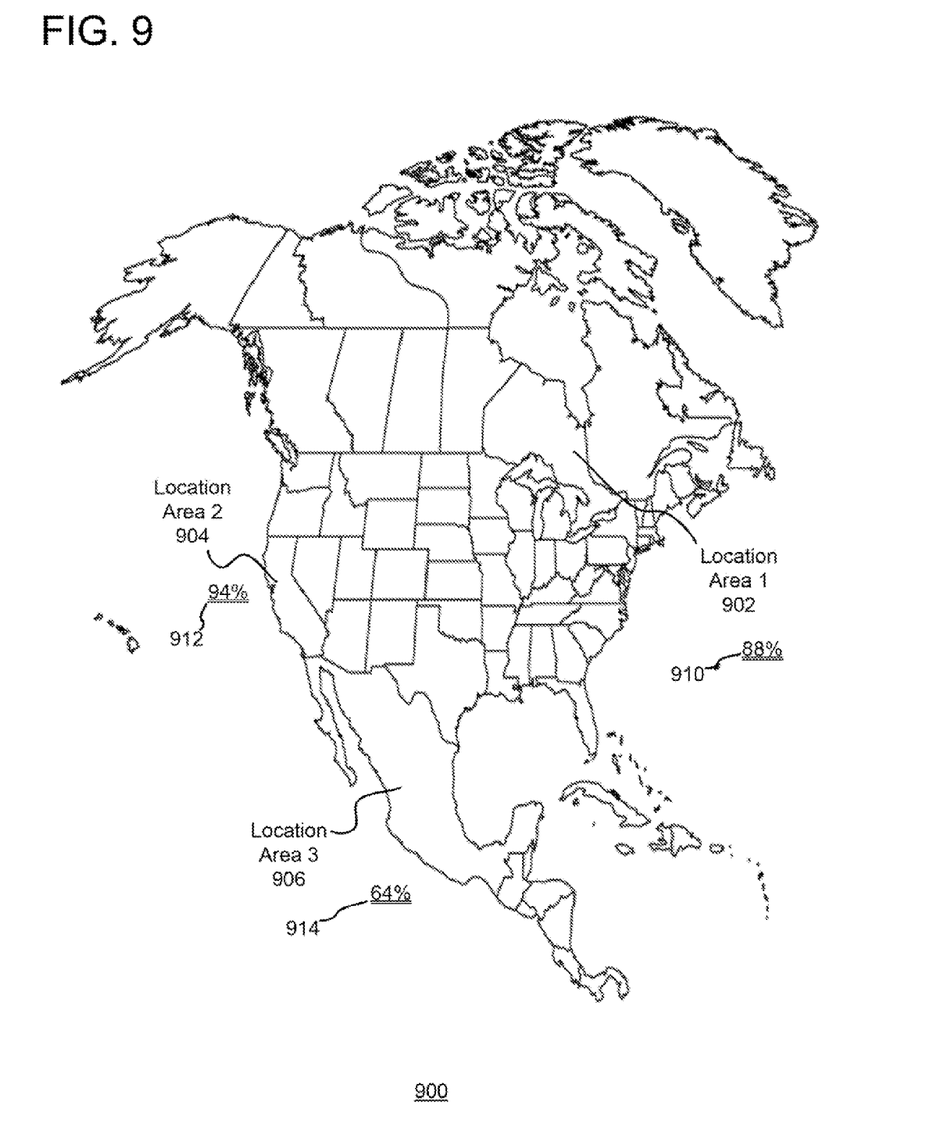
FIG. 9 is an illustrative example of a mapping of identified visual features of visual images to location areas.

FIG. 9 is an illustrative example of one type of mapping 900 of identified visual features of visual images to location areas which may be provided by the technique of FIG. 8. Mapping 900 depicts a geographic region, which in this example is North and Central America. Mapping 900 includes a plurality of ratios or percentages 910, 912, and 914 which are mapped to a plurality of location areas 902, 904, and 906, respectively. Location area 902 corresponds to the province of Ontario, Canada; location area 904 corresponds to the state of California, U.S.A.; and location area 906 corresponds to the country of Mexico. Percentage 910 is indicated as 88%; percentage 912 is indicated as 94%; and percentage 914 is indicated as 64%. The percentages 910, 912, and 914 are based on the corresponding aggregate counts of the visual features identified in those corresponding location areas, over the total number of possibilities.

In this example of FIG. 9, the visual feature is a facial expression indicative of mood (e.g., a "smile"), which includes the additional visual feature of a human face, so that a ratio or percentage of "smiles to faces" is determined from the count of the facial expressions (e.g., smiles) to the total number of human faces in the visual image. This may be indicative of how relatively happy people are in the corresponding location areas. In this example, it appears that the state of California is the most happiest at 94% whereas the country of Mexico is the least happy at 64%.

Although FIG. 9 illustrates one type of mapping which utilizes a map and text which indicates the counts, ratios, or percentages, any suitable type of mapping may be utilized. For example, a chart or graph for mapping the geographic locations to the counts, ratios, or percentages may be produced and displayed. As another example, a heat map for mapping location to the counts, ratios, or percentages may be produced and displayed. A heat map is a data visualization in the form of a map which uses color or shading to represent the data values. There are many different types of heat maps used in different disciplines, each of which may use various visualization techniques.

As provided herein, methods and apparatus for use in mapping identified visual features of visual images to location areas has been described. In one illustrative example, a computer device is configured to analyze image data of a visual image for identifying whether the visual image includes a visual feature; produce a message which includes a visual feature indication which indicates whether the visual image includes the visual feature and a location indication which indicates a location at which the visual image was captured; and send the message to a server. The server is configured to produce, for a plurality of location areas, an aggregate count of visual feature indications from a plurality of messages received from a plurality of computer devices for visual images captured within the same location area, and map the aggregate counts to location area indications corresponding to the location areas.

The above-described embodiments of the present disclosure are intended to be examples only. Those of skill in the art may affect alterations, modifications and variations to the particular embodiments without departing from the scope of the application. The invention described herein in the recited claims intends to cover and embrace all suitable changes in technology.

What is claimed is:

1. A method for use in a computer device, the method comprising:
   in a user wireless communication device comprising a camera module:
      capturing a visual image;
      analyzing image data of the visual image to identify whether the visual image includes a first and a second visual features; and
      producing a message which includes two visual feature indications and a location indication, a first visual feature indication indicating whether the visual image includes the first visual feature, the first visual feature indication comprising a first count of a number of times the visual image includes the first visual feature, a second visual feature indication indicating whether the visual image includes the second visual feature, the second visual feature indication comprising a second count of a number of times the visual image includes the second visual feature, the second visual feature indication indicating a relationship between the first count and the second count, the location indication indicating a location at which the visual image was captured.

2. The method of claim 1, wherein the visual feature of the visual feature indication included in the message is a facial expression indicative of mood.

3. The method of claim 2, further comprising:
   including in the message a count of a number of times the visual image includes a human face.

4. The method of claim 1, further comprising:
   including in the message a strength indication which indicates a strength regarding an accuracy of detection of the visual feature.

5. The method of claim 1, further comprising:
   including in the message at least one of a date and a time when the visual image was captured.

6. The method of claim 1, further comprising:
for each one of a plurality of visual images:
capturing the visual image; and
geotagging the visual image with location data corresponding to the location indication.

7. The method of claim 1, further comprising:
sending the message to a server.

8. The method of claim 7, which is performed without sending the visual image to the server.

9. The method of claim 7, further comprising:
sending the visual image to the server.

10. The method of claim 7, further comprising:
repeating the analyzing, the producing, and the sending of the message for each one of a plurality of additional visual images.

11. The method of claim 7, wherein the computer device comprises a wireless communication device configured to communicate in a wireless communication network, and wherein the act of sending the message to the server comprises transmitting the message to the server via the wireless communication network.

12. A non-transitory computer program product, comprising:
a computer readable medium;
computer instructions stored in the computer readable medium;
the computer instructions being executable by one or more processors of a user wireless communication device comprising a camera module for:
analyzing image data of a visual image for identifying whether the visual image includes a first and a second visual features; and
producing a message which includes two visual feature indications and a location indication, a first visual feature indication indicating whether the visual image includes the first visual feature, the first visual feature indication comprising a first count of a number of times the visual image includes the first visual feature, a second visual feature indication indicating whether the visual image includes the second visual feature, the second visual feature indication comprising a second count of a number of times the visual image includes the second visual feature, the second visual feature indication indicating a relationship between the first count and the second count, the location indication indicating a location at which the visual image was captured.

13. A user wireless computer device, comprising:
one or more processors;
a camera module coupled to the one or more processors, the camera module being configured to capture visual images;
a memory coupled to the one or more processors;
the one or more processors being configured to:
analyze image data of a visual image for identifying whether the visual image includes a first and a second visual features; and
produce a message which includes two visual feature indications and a location indication, a first visual feature indication indicating whether the visual image includes the first visual feature, the first visual feature indication comprising a first count of a number of times the visual image includes the first visual feature, a second visual feature indication indicating whether the visual image includes the second visual feature, the second visual feature indication comprising a second count of a number of times the visual image includes the second visual feature, the second visual feature indication indicating a relationship between the first count and the second count, the location indication indicating a location at which the visual image was captured.

14. The computer device of claim 13, wherein the visual feature of the visual feature indication included in the message is a facial expression indicative of mood.

15. The computer device of claim 13, wherein the one or more processors are further configured to:
include in the message a strength indication which indicates a strength regarding an accuracy of detection of the visual feature.

16. The computer device of claim 13, wherein the one or more processors are further configured to:
include in the message at least one of a date and a time when the visual image was captured.

17. The computer device of claim 13, further comprising:
a transceiver coupled to the one or more processors; and
the one or more processors being further configured to send the message to a server.

18. The computer device of claim 13, wherein the one or more processors are further configured to:
repeat the analyzing, the producing, and the sending of the message for each one of a plurality of additional visual images.

* * * * *